Patented Mar. 2, 1943

2,312,801

UNITED STATES PATENT OFFICE 2,312,801

INSECTICIDE

W E Craig, Philadelphia, and William F. Hester, Drexel Hill, Pa., assignors to Röhm & Haas Company, Philadelphia, Pa.

No Drawing. Application June 28, 1940, Serial No. 342,894

5 Claims. (Cl. 167—30)

This invention relates to insecticidal compositions the active principle of which is an allyl or methallyl ether of a nitrophenol.

These ethers are designated by the general formula

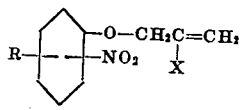

in which X is hydrogen or a methyl group and R may be hydrogen, halogen, or an alkyl, aralkyl, cycloalkyl, alkylene, alkoxy, aryloxy, acyl or carbalkoxy group. The benzene nucleus may contain more than one such substituent and may also contain a second nitro group. These ethers can be prepared by condensing allyl chloride or methallyl chloride with the nitrated phenol in the presence of sodium hydroxide. In carrying out this condensation it is advantageous to employ about one-half mol of dimethylaniline per mol of sodium hydroxide as this increases the yield of the ether.

The following examples will illustrate the method of preparing the allyl and methallyl ethers of the nitrophenols.

Example 1

A mixture of 3.09 kg. of the sodium salt of p-nitrophenol (67.5% calculated as p-nitrophenol), 2.035 kg. of methallyl chloride, 122 g. of 50% aqueous solution of sodium hydroxide, 908 g. of dimethylaniline and 12 liters of water was stirred at refluxing temperature for four hours during which time the temperature of the mass rose to 97° C. After cooling, the solid material was dissolved in three liters of ethylene chloride and separated from the aqueous layer. The solution thus obtained was washed with 10 liters of N/1 sodium hydroxide solution followed by 22.5 liters of N/1 hydrochloric acid and finally with 7.5 liters of water. The solvent was then evaporated and the residue heated at 100° C. and 28 mm.; 2.61 kg. of crude methallyl p-nitrophenyl ether was obtained. This may be purified by fractional distillation, the fraction boiling at 128-145° C./2 mm. being the desired product. About 80% of the crude product distills over in this range. It may also be purified by dissolving 450 g. in 1.1 liters of hot petroleum ether (B. P. 60-100° C.), clarifying the solution with charcoal and cooling. The product separates as a tan-colored solid melting at 38-40° C.

Example 2

A mixture of 976 g. of o-nitro-p-ter.butyl phenol, 905 g. of methallyl chloride, 450 g. of 50% sodium hydroxide, 302.5 g. of dimethylaniline and 4 liters of water was heated for six hours at refluxing temperature. The resulting mixture was extracted with benzene. The benzene solution was washed with aqueous alkali to remove any unreacted phenol and with aqueous hydrochloric acid to remove the dimethylaniline and finally with water. The benzene was then evaporated and the residue heated under reduced pressure at 100° C.; 1223 g. of methallyl p-ter.butyl-o-nitrophenyl ether was thus obtained as an oil.

Example 3

A mixture of 68 g. of p-tertiary butyl-o-mono-nitrophenol, 31 g. of 49% sodium hydroxide, 280 cc. of water, 21 g. of dimethylaniline and 40 g. of allyl chloride was stirred and heated at refluxing temperature for six hours. During this time the temperature of the reacting mixture rose to 97° C. After cooling, the product separated into a lower oily layer and an upper aqueous layer which was removed and extracted with 200 cc. of petroleum ether (B. P. 60-100° C.). The solution thus obtained was added to the oily layer and this was then extracted four times with 2N-hydrochloric acid to remove the dimethylaniline, washed with water and then extracted four times with 2N-sodium hydroxide to remove any unreacted phenol. This solution was then washed with water, filtered and the solvent evaporated. In this way 68 grams of p-tertiary-o-nitrophenyl allyl ether was obtained which on analysis showed 5.18% of nitrogen, calc. 5.96%, B. P. 146-153° C./2.5 mm.

Among the phenols which may be employed in place of those in the foregoing examples are:

Diamylnitrophenol, caprylnitrophenol, (chloro-ter.butyl)nitrophenol, o-chloro-p-nitrophenol, o-bromo-p-nitrophenol, p-ter.-butyl-o-bromo-o'-nitrophenol, p - ter.butyl - o - o' - dinitrophenol, methallylnitrophenol, m-nitrophenol, cyclohexyl-nitrophenol, phenylnitrophenol, nitroguaiacol, nitronaphthol, benzylnitrophenol, o-nitrophenol, p - ter.amyl - o - nitrophenol, p-($\alpha,\alpha,\gamma,\gamma$ - tetra-methylbutyl) - o -nitrophenol, p-($\alpha,\alpha,\gamma,\gamma$ - tetra-methylbutyl) -o'-nitro-o-cresol etc.

When employed as insecticides these ethers may be applied in the form of a solution in an organic solvent, as an aqueous emulsion or as a dust in combination with an inert powder. The particular method employed will depend to a large extent on the insect or class of insect being combatted. When used against sucking insects such as red spiders, the ether is dissolved in a suitable organic liquid which has no deleterious effect on the foliage and this solution is emulsified in water with the help of a suitable emulsifying agent such as a sulfonated oil which is usually dissolved in the organic liquid prior to emulsification. A suitable formula for this type of spray is:

| | Parts |
|---|---|
| Active ingredient | 1.0 |
| Emulsifying agent | 1.0 |
| Pine oil | 2.0 |

One part of this solution is emulsified in 100 to 400 parts of water depending on the concentration of the active ingredient required for any special case, thus yielding emulsions in which the concentration of the active ingredient ranges from about one part in 400 (1:400) to about one part in 1600 (1:1600). The emulsion thus prepared is sprayed on the infested plants. When employed against aphids on nasturtium the following results were obtained:

Concentration 1:1600:

|  | Per cent kill in 24 hours |
|---|---|
| o-Nitrophenyl methallyl ether | 36 |
| p-ter. Butyl-o-nitrophenyl methallyl ether | 66 |
| p-ter. Amyl-o-nitrophenyl methallyl ether | 91 |
| p-($\alpha,\alpha,\gamma,\gamma$-Tetramethylbutyl)-o-nitrophenyl methallyl ether | 55 |
| p-ter. Butyl-o-nitrophenyl allyl ether | 53 |

In no case was there any injury to the foliage.

Against mealy bugs on coleus the following results were obtained:

Concentration 1:1200:

|  | Per cent kill in 24 hours |
|---|---|
| p-ter. Butyl-o-nitrophenyl methallyl ether | 59 |
| p-ter. Amyl-o-nitrophenyl methallyl ether | 35 |
| p-($\alpha,\alpha,\gamma,\gamma$-Tetramethylbutyl)-o-nitrophenyl methallyl ether | 81 |

No injury to the foliage.

Against red spider on bush beans:

Concentration 1:1200:

|  | Per cent kill in 24 hours |
|---|---|
| o-Nitrophenyl methallyl ether | 32 |
| p-Nitrophenyl methallyl ether | 95 |
| p-Nitrophenyl-methallyl ether | 90 |
| p-ter. Butyl-o-nitrophenyl methallyl ether | 90 |
| p-ter. Amyl-o-nitrophenyl methallyl ether | 84 |
| p-ter. Amyl-o-nitrophenyl methallyl ether | 97 |
| p-($\alpha,\alpha,\gamma,\gamma$-Tetramethylbutyl)-o-nitrophenyl methallyl ether | 78 |
| p-ter. Butyl-o-nitrophenyl allyl ether | 100 |

No injury to the foliage.

Against 2-spotted mite on phlox:

Concentration 1:1200:

|  | Per cent kill in 24 hours |
|---|---|
| p-($\alpha,\alpha,\gamma,\gamma$-Tetramethylbutyl)-o-nitrophenyl methallyl ether | 81 |

No injury to the foliage.

The nitrophenyl-methallyl ethers can also be spread on inert powders and used in the form of dry dust or suspended in water to combat various insects. The dusts may be prepared by dissolving the ether and a spreading agent in a suitable solvent such as acetone, adding a finely divided solid such as talc, lime, alum sludge, etc. and evaporating the solvent while stirring constantly to insure uniform distribution of the active material. The finished dust may contain from 1 to 10% of the active ingredient. Suitable formulas for such dusts are:

| A. | Parts by weight |
|---|---|
| Active ingredient | 1 |
| Talc or lime | 98 |
| Spreader (cetyl dimethylethyl ammonium ethyl sulfate) | 1 |

| B. | Parts by weight |
|---|---|
| Active ingredient | 1 |
| Alum sludge | 48 |
| Lime | 48 |
| Soya bean oil | 3 |

A 2% dust similar to the one shown under A in which the active ingredient was p-nitrophenyl methallyl ether killed 94% of the aphids on nasturtium in 24 hours.

Sprays to combat chewing insects can be made by depositing a larger amount of the active ingredient on a powder, adding a wetting agent and dispersing the powder in sufficient water to give the desired concentration of active ingredient. A suitable formula for such a spray is as follows:

|  | Parts by weight |
|---|---|
| Active ingredient | 1 |
| Magnesium carbonate | 2 |
| Emulsifying agent | 0.5 |
| Water | 96.5 |

This spray was applied to bush beans and, after standing for 24 hours, bean beetle larvae were applied to the plants. At the end of 48 hours the following results were noted:

| Active ingredient | Dead | Incapacitated |
|---|---|---|
|  | Per cent | Per cent |
| o-Nitrophenyl methallyl ether | 50 | 36 |
| p-ter. Butyl-o-nitrophenyl methallyl ether | 46 | 50 |

The foregoing examples illustrate the use of nitrophenyl methallyl ethers as the sole toxic ingredient of insecticidal preparations. They may, however, also be used in combination with other well known insecticidal principles, such as derris, rotenone, nicotine sulfate, organic thiocyanates, and various inorganic preparations including the arsenic poisons and copper fungicides. Such combinations may be designed to give a plurality of effects or a single improved effect.

We claim:

1. An insecticidal composition in which the active principle is a methallyl ether of nitro-substituted phenols of the benzene and naphthalene series.

2. An insecticidal composition in which the active principle is a methallyl ether of nitro-substituted alkyl phenols of the benzene and naphthalene series.

3. An insecticidal composition in which the active principle is a nitrophenyl methallyl ether.

4. An insecticidal composition in which the active principle is p-ter. butyl-o-nitrophenyl methallyl ether.

5. An insecticidal composition in which the active principle is p-($\alpha,\alpha,\gamma,\gamma$-tetramethylbutyl)-o-nitrophenyl methallyl ether.

W E GRAIG.
WILLIAM F. HESTER.